(12) United States Patent
Nguyen et al.

(10) Patent No.: US 7,337,309 B2
(45) Date of Patent: Feb. 26, 2008

(54) SECURE ONLINE BIOS UPDATE SCHEMES (75) Inventors: Tom Long Nguyen, Auburn, WA (US);
Ling Yee Sy, Federal Way, WA (US)

(73) Assignee: Intel Corporation, Santa Clara, CA (US)

( * ) Notice: Subject to any disclaimer, the term of this patent is extended or adjusted under 35 U.S.C. 154(b) by 446 days.

(21) Appl. No.: 10/396,634

(22) Filed: Mar. 24, 2003

(65) Prior Publication Data

US 2004/0193865 A1 Sep. 30, 2004

(51) Int. Cl.
*G06F 9/00* (2006.01)
*G06F 9/24* (2006.01)
*G06F 15/177* (2006.01)

(52) U.S. Cl. .................. 713/1; 713/2; 713/100
(58) Field of Classification Search ............. 713/1, 713/2, 100; 717/168, 169, 174, 175
See application file for complete search history.

(56) References Cited

U.S. PATENT DOCUMENTS

| | | | | |
|---|---|---|---|---|
| 5,388,267 A | * | 2/1995 | Chan et al. ............. | 713/2 |
| 5,826,015 A | * | 10/1998 | Schmidt ................ | 713/201 |
| 5,835,761 A | * | 11/1998 | Ishii et al. .............. | 713/100 |
| 5,844,986 A | * | 12/1998 | Davis ................... | 713/187 |
| 5,960,445 A | * | 9/1999 | Tamori et al. .......... | 707/203 |
| 5,964,873 A | * | 10/1999 | Choi ..................... | 713/2 |
| 6,009,524 A | * | 12/1999 | Olarig et al. ........... | 713/200 |
| 6,266,809 B1 | * | 7/2001 | Craig et al. ............ | 717/173 |
| 6,438,688 B1 | * | 8/2002 | Nunn .................... | 713/2 |
| 6,581,159 B1 | * | 6/2003 | Nevis et al. ............ | 713/2 |
| 6,715,074 B1 | * | 3/2004 | Chaiken ................ | 713/164 |
| 6,732,267 B1 | * | 5/2004 | Wu et al. ............... | 713/100 |
| 6,769,059 B1 | * | 7/2004 | Qureshi et al. ......... | 713/2 |
| 6,834,384 B2 | * | 12/2004 | Fiorella et al. ......... | 717/169 |
| 7,069,452 B1 | * | 6/2006 | Hind et al. ............. | 713/2 |

* cited by examiner

*Primary Examiner*—Thomas Lee
*Assistant Examiner*—Ji H Bae
(74) *Attorney, Agent, or Firm*—Blakely, Sokoloff, Taylor & Zafman LLP

(57) ABSTRACT

A method for securely updating a basic input/output system (BIOS) using a multi-layer scheme. A new BIOS image is received and stored at a computer system. In one embodiment, the new BIOS image is sent to the computer system in a BIOS capsule that also contains the data structure and instructions of how to build a new BIOS image for the computer system.

The current BIOS image of the computer system is maintained in a first portion of the BIOS. An access check verifies the integrity of a data structure representation of the current BIOS image. An administration check verifies that proper authority has requested the BIOS update. A checksum is performed on the new BIOS image while writing the new BIOS image to a second portion of the BIOS. Once the new BIOS image passes the multi-layer check, indicia is provided such that the computer system loads BIOS instructions from the new BIOS image on subsequent boots of the computer system. If the multi-layer check fails, the BIOS instructions are loaded from the current BIOS image during subsequent boots.

26 Claims, 7 Drawing Sheets

SECURE ONLINE BIOS UPDATE SCHEMES

FIELD OF THE INVENTION

The field of invention relates generally to the Basic Input/Output System (BIOS) of a computer system and, more specifically but not exclusively relates to a method for securely updating a computer system BIOS.

BACKGROUND INFORMATION

Computer platform firmware is used during initialization of computer systems to verify system integrity and configuration. It also generally provides the basic low-level interface between hardware and software components of those computer systems, enabling specific hardware functions to be implemented via execution of higher-level software instructions contained in computer programs that run on the computer systems. In computers, a primary portion of this firmware is known as the Basic Input/Output System (BIOS) of a computer system. The BIOS comprises a set of permanently recorded (or semi-permanently recorded in the case of systems that use Flash Memory BIOS) software routines that provide the system with its fundamental operational characteristics, including instructions telling the computer how to test itself when it is turned on, and how to determine the configurations for various of built-in components and add-on peripherals.

Figure 1:
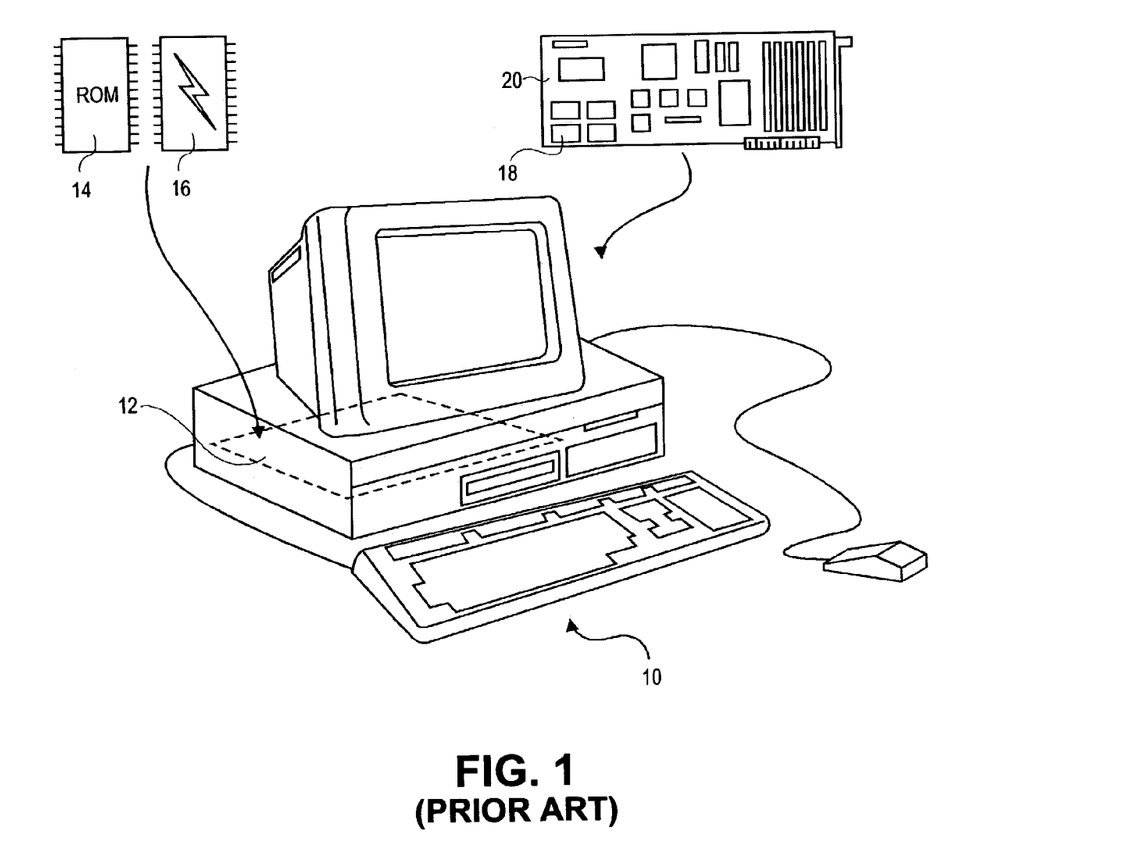
FIG. 1 is a schematic diagram illustrating how a BIOS is stored in a conventional personal computer.

In a typical computer system, the BIOS is generally defined as the code that runs between the processor reset and the first instruction of the Operating System (OS) loader. As shown in FIG. 1, in a typical personal computer (PC) 10, the base portion of the BIOS code is stored in some type of ROM (read only memory) device on the PC's motherboard 12, such as a standard PROM 14 or a Flash Memory 16. In some configurations, this base portion may be extended using code stored in ROM BIOS chips 18 contained on one or more add-on peripheral cards 20, such as SCSI controllers and bus-mastering devices. This portion of the BIOS is stored in components that are commonly referred to as "option ROMS." The BIOS code in peripheral card ROM BIOS chips 18 typically concerns specific functionality provided by their corresponding peripheral card and is executed during initialization of that peripheral card according to a well-defined (mostly) set of rules. In either of the foregoing configurations, all firmware BIOS is stored locally, either on the motherboard or in option ROMs on the peripheral card(s) added to a system.

In many instances, in order to enhance the computer system's functionality, the BIOS code needs to be updated. In today's computer systems, this may be accomplished by either replacing the BIOS chip(s) on the motherboard (and/or peripheral cards), or, if the BIOS is contained in a rewriteable chip (e.g., Flash Memory), executing a BIOS update software program that writes the new BIOS code to the chip.

Popular methods for updating BIOS on rewriteable chips has certain risks and limitations due to their passive nature and lack of security safeguards. For instance, a user may mistakenly update the current BIOS code with an inappropriate set of new code for a particular computer system. Also, a new BIOS code may be corrupted so that upon computer system reboot, the corrupted code causes a system failure. In another example, an error in writing the new BIOS to a rewriteable chip may result in a system failure upon reboot. Additionally, unauthorized users (e.g., hackers) may try to update the current BIOS code in order to purposefully cause a computer system reboot failure or to gain clandestine access to a computer system.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified.

DETAILED DESCRIPTION

Embodiments of a method and an apparatus for a multi-layer secure update of a BIOS are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 2:
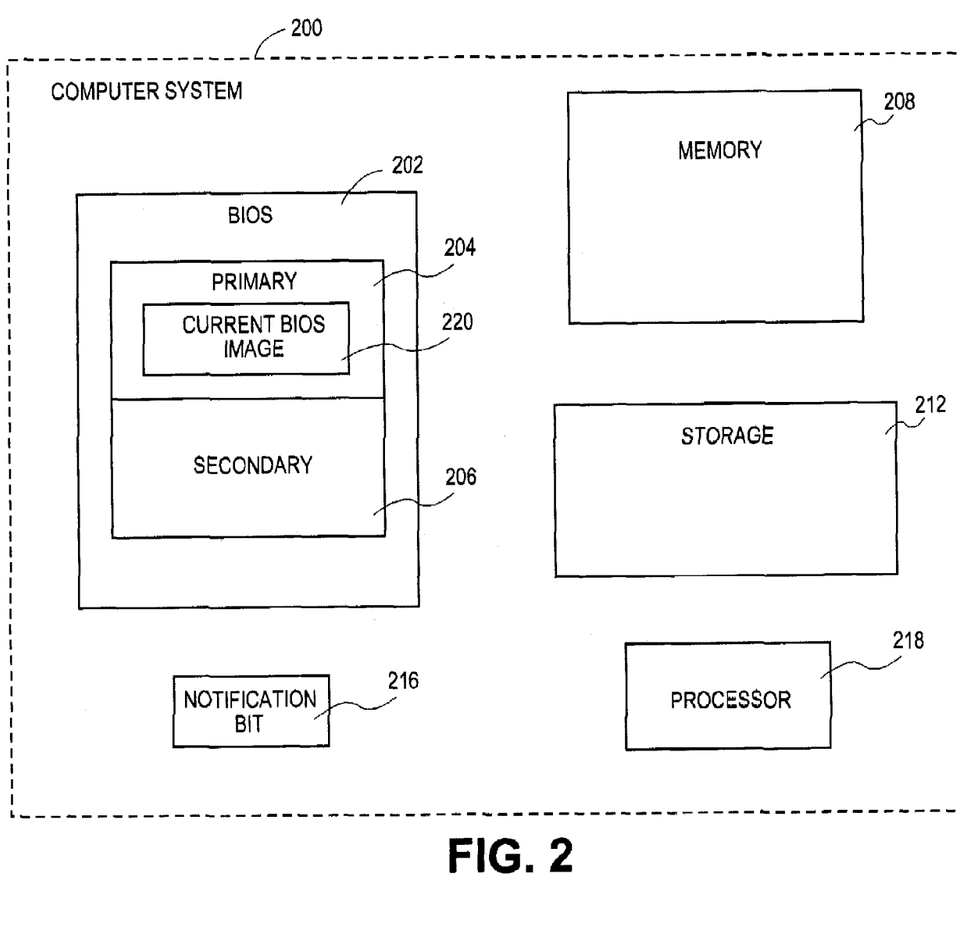
FIG. 2 is an exemplary computer system in which an embodiment of the invention may be implemented.

FIG. 2 is an illustration of a computer system 200 according to one embodiment of the present invention. The computer system 200 includes a BIOS 202 coupled to a bus (not shown). A memory 208, a storage 212, a processor 218, and a notification bit 216 are also coupled to the bus. The memory 208 may be one or more memory devices including but not limited to, dynamic random access memory (DRAM), and static random access memory (SRAM). Storage 212 may be a magnetic hard drive, an optical disk, or the like. The processor 218 may be a conventional microprocessor, such as, but not limited to, an Intel Corporation Pentium family microprocessor, an Intel Corporation Itanium family processor, a Motorola microprocessor, or the like. An exemplary computer system for implementing one embodiment of the present invention is discussed further in conjunction with FIG. 7.

The notification bit 216 is a temporary storage device utilized by software and/or firmware executable on computer system 200. The notification bit 216 can be maintained in memory 208, a register, a cache, and the like. It is appreciated that the term "notification bit" is not intended to restrict the information stored therein to a single bit, but includes any indicia to indicate whether or not the BIOS of computer system 200 has been successfully updated.

Figure 4:
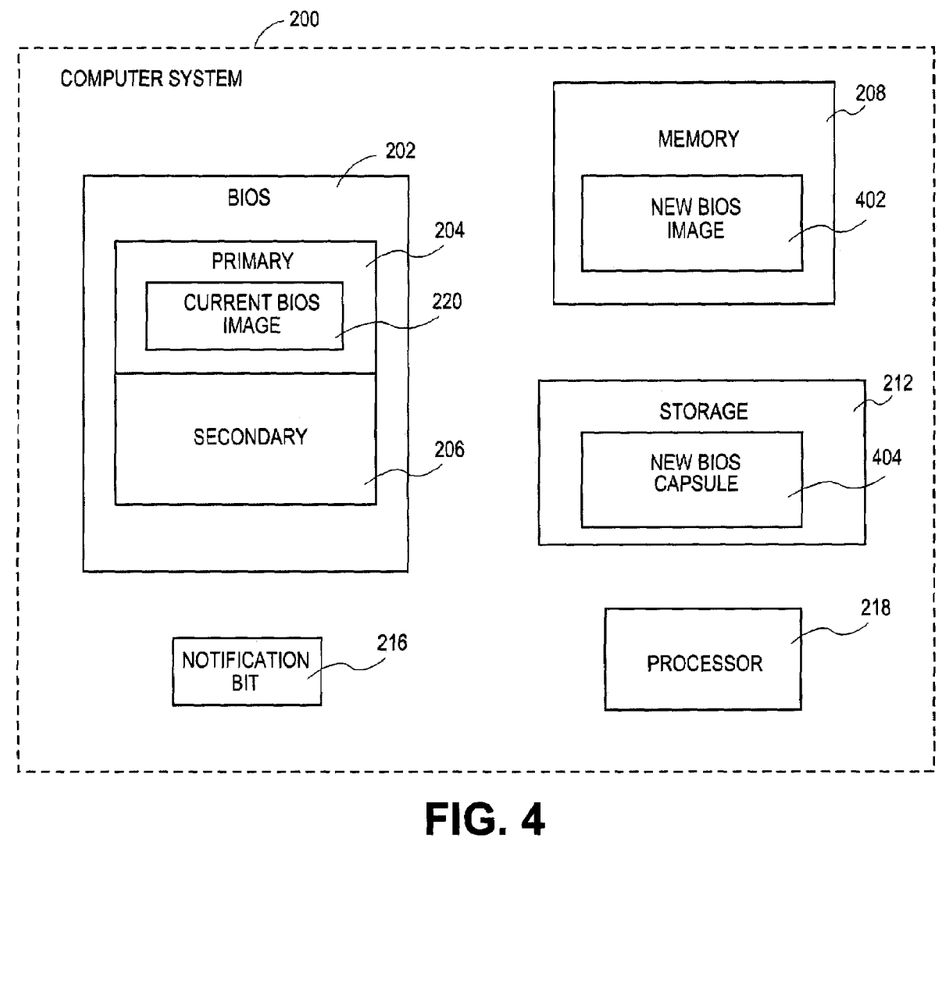
FIGS. 4 and 5 are schematic diagrams of an exemplary computer system in which an embodiment of the invention may be implemented.

The BIOS 202 includes a primary portion 204 and a secondary portion 206. The primary portion 204 contains a current BIOS image 220 for the computer system 200. The current BIOS image 220 and new BIOS image 402 (discussed below) includes the BIOS code and data for computer system 200. According to one embodiment, the current BIOS image 220 and the new BIOS image 402 do not fill the entire storage area of the primary portion 204 and the secondary portion 206, respectively. In one embodiment, only one BIOS image, stored either in the primary portion 204 or secondary portion, is executed at a time.

In one embodiment of the invention, on startup, the BIOS 202 tests the computer system 200 and prepares the computer system 200 for operation by querying its own memory for drive and other configuration settings. The BIOS 202 searches for other BIOS's on the plug-in boards and sets up pointers (interrupt vectors) in memory 208 to access those routines. The BIOS 202 then loads the operating system and passes control to the OS. The BIOS 202 also accepts requests from drivers as well as application programs during OS run-time of the computer system 200.

In one embodiment, the BIOS 202 is stored in a flash memory device. Those skilled in the art will understand that the invention may be implemented in other types of persistent storage devices for maintaining firmware code and/or data, and the embodiments of the invention using flash devices discussed herein are merely exemplary schemes for practicing the invention.

Flash Memory is a non-volatile memory technology that allows manufactures and (with the appropriate hardware/software) end users to electrically erase and (re)program information. Flash Memory is typically erased in units of memory called blocks instead of being erased at the bit level, wherein all bits in a given block are switched to a predetermined polarity (i.e., logic level) when the block is erased. In one embodiment, the block size is 64 k. In another embodiment, the block size is 32 k. In one common type of flash memory, such as flash memory devices manufactured by Intel, blocks of memory are erased electronically by setting all bits in a block to 1's. Data can then be written to the block by flipping individual bits to 0's to form appropriate bit patterns corresponding to the data. In other types of flash devices, the erased logic state is all 0's, and writing data to these devices comprising changing individual bits to 1's. It is noted that in conventional flash devices, individual bits cannot be flipped from a changed (i.e., set) logic level back to the erased logic level; in order to update data in a block, all of the bits have to be erased first, and then rewritten.

With reference to the flowchart of FIG. 3 and the schematic diagrams of FIGS. 4-5, a multilayer secure update of a BIOS proceeds in the following manner. In one embodiment, a software application, such as a BIOS update utility, stored on computer system 200 contains machine-executable instructions executable by processor 218 to perform at least one of the blocks illustrated in FIG. 3.

Figure 3:
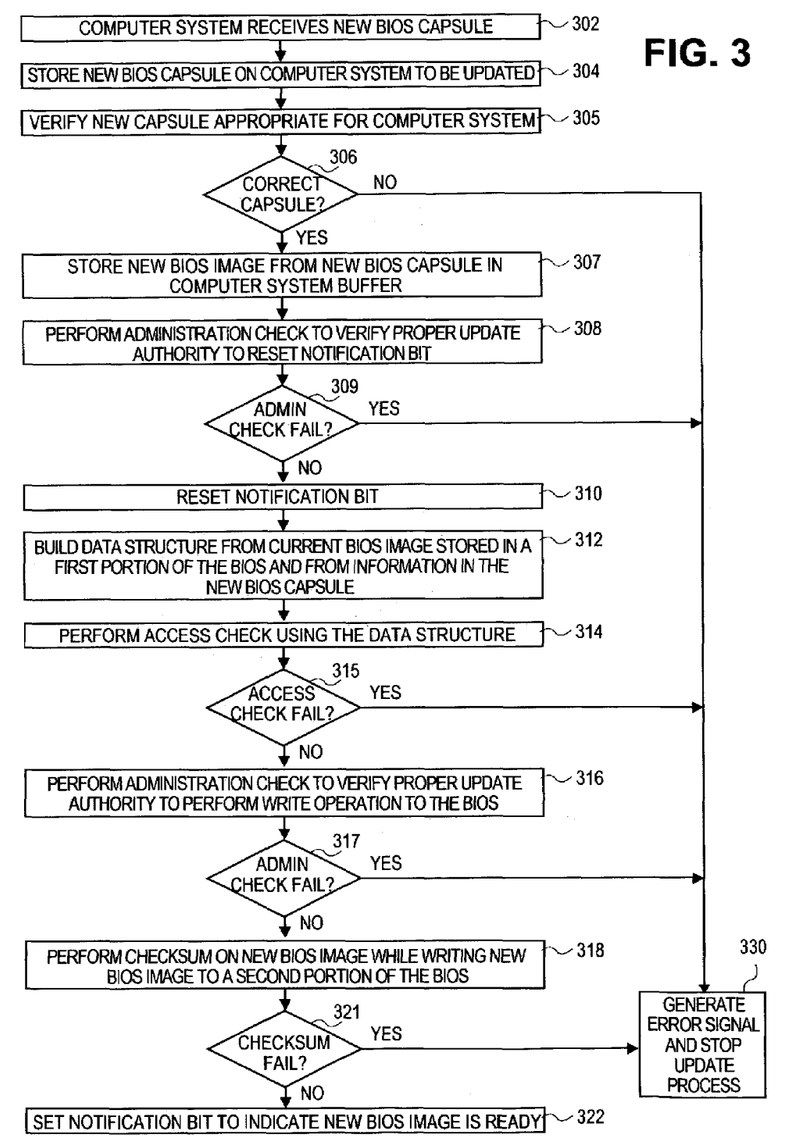
FIG. 3 is a flowchart for illustrating the logic used by one embodiment of the invention for securely updating a BIOS.

Referring to FIGS. 3 and 4, the BIOS update process begins in a block 302, in which computer system 200 receives a new BIOS capsule 404. The new BIOS capsule 404 may include a new BIOS binary. The new BIOS binary may include a whole new BIOS image or a portion of a new BIOS image. The new BIOS capsule 404 may also include information for building a new BIOS image 402 and building an Area Table 502 (discussed below), a BIOS update utlllty, information readable by a BIOS update utility stored on computer system 200, and user support documentation. Generelly, the new BIOS capsule 404 may be received from various sources that include, but are not limited to, downloadlng from another computer system via the Infernet. reading a computer rsadable media (e.g., a CD-ROM), and the like. In one embodiment. the new BIOS capsule 404 is In a compressed file format, such as those readable by WinZip. After being received, the new BIOS capsule 404 is placed in storage 212 of computer system 200 in a block 304.

Next, in a block 305, the new BIOS capsule 404 is verified Eo ensure the new BIOS capsule 404 is appropriate for computer system 200. If the new BIOS capsule 404 is nut appropriate for computhr system 200, as determined in a decision block 306, then an error signal is generated and the BIOS update process is stopped, as shown in a block 330. Generally, this error signal may be used to generate an error message for the user or may be used by computer system 200 to perform some other action.

If it is determined in decision block 306 that the new BIOS capsule 404 is appropriate, the new BIOS image 402 is extracted from the new BIOS capsule 404 and placed in memory 208 in a block 307. Here, memory 208 is acting as a buffer to hold the new BIOS image 402 before writing the new BIOS image 402 to BIOS 202. In this way, the new BIOS image 402 can be tested and verified while in memory 208 and thus prevent a corrupted or hacked BIOS image from being written to BIOS 202.

In a block 308, an administration check is performed. The administration check verifies whether a requested operation pertaining to the BIOS 202 is authorized. In block 308, the administration check verifies whether a request to reset the notification bit 216 has been requested by proper authority. In one embodiment. computer system 200 verifies the access level of the user requesting a BIOS update. Typically, the user must have the access level of a system administrator to perform a BIOS update. If the administration check fails, as depicted by a decision block 309, the logic proceeds to block 330, wherein an error signal is generated and the BIOS update process is stopped in the manner described above.

Upon a successful administration check, the logic proceeds to a block 310, which resets notification bit 216. A set notification bit 216 indicates that the BIOS update was successfully completed and the new BIOS image 402 is ready to be executed, while a reset notification bit 216 indicates that a BIOS update has not occurred (or was unsuccessful) and that the current BIOS image 220 is to be executed upon reboot. The notification bit 216 is reset to ensure that the notification bit indicates an update of the BIOS has not occurred since the last boot of computer system 200. Ensuring the notification bit 216 is reset prior to executing a BIOS update prevents unpredictable behavior that may occur on reboot if the BIOS update prooess was not completed. For example, the BIOS update may not have been completed because the new BIOS image 402 failed a security check, or because a power failure to computer system 200 occurred during the BIOS update.

In a block 312, a (data structure is constructed based on the current BIOS image 220 and information in the new BIOS capsule 404. In one embodiment, this data structure is defined in an area table. The area table is constructed based on the structure of the current BIOS image 220, information of the current BIOS image 220 (e.g., a Globally Unique Identifier (GUID) or a digital signature), and instructions from the new BIOS capsule 404 that indicate how to update the BIOS 202.

Figure 5:
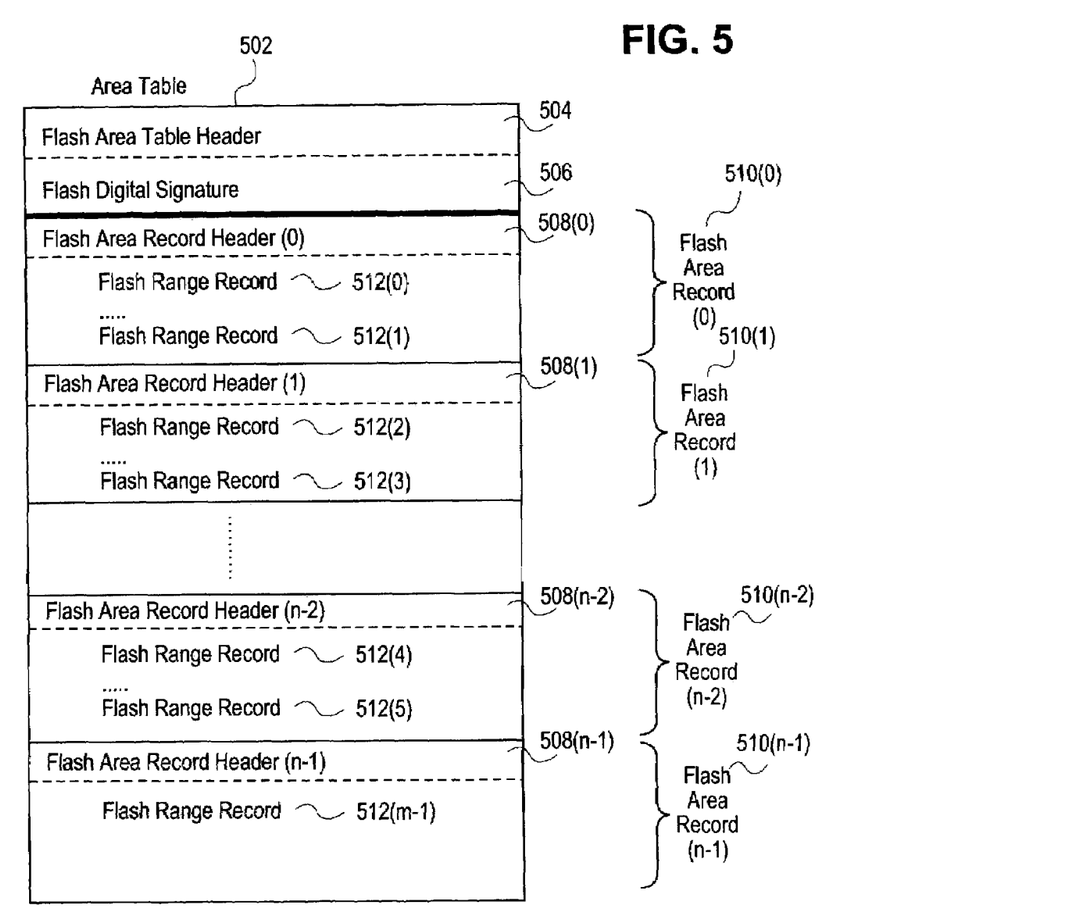

FIG. 5 shows one embodiment of an Area Table 502 corresponding to a BIOS 202 that is stored in a flash memory device of computer system 200. Area Table 502 includes a Flash Area Table Header 504, a Flash Digital Signature 506, and Flash Area Records 510 (0) to (n−1) where n is the total number of Flash Area Records. Each Flash Area Record 510 has a Flash Area Record Header 508(0) to 508(n−1). Each Flash Area Record 510 also includes at least one Flash Range Record 512(0) to 512 (m−1) where m is the total number of Flash Range Records. Each Flash Range Record 512 contains the address range of a portion of Flash memory. In one embodiment, each Flash Range Record 512 contains the address range of a segment of Flash memory. It should be noted that a segment of Flash memory corresponds to a block of Flash memory. In this embodiment, the size of each Flash Range Record 512 cannot exceed the size of a block of Flash memory.

Generally, Area Table 502 will be maintained in a temporary storage means on computer system 200. In one embodiment, Area Table 502 is placed into memory 208 of computer system 200.

In one embodiment, the Flash Area Table Header 504 and each Flash Area Record Header 508(0) to 508(n−1) contain a Globally Unique Identifier (GUID). A GUID is a unique identifier used to identify a particular component, application, file, database entry, piece of data, piece of code, or a user. Here, the GUIDs are defined by original equipment manufacturers (OEMs) and used to identify each header type of the current BIOS image 220. The GUIDs from the current BIOS image 220 are put in the Area Table 502 with their corresponding headers. Also, the Flash Digital Signature 506 is obtained from the Flash Digital Signature of the current BIOS image 220 as defined by the OEM.

In a block 314, an access check is performed. Generally, the access check verifies the integrity of the data structure built in block 312. The integrity of the data structure built in block 312 is verified because it will be used in writing the new BIOS image 402 to the secondary portion 206. In one embodiment, information in the current BIOS image 220 is compared with information in the data structure. In one embodiment, the GUID of each header in the Area Table 502 is verified against the corresponding Original Equipment Manufacturer (OEM) defined GUID header of the current BIOS image 220. In another embodiment, the Flash Digital Signature 506 is verified against the OEM defined Flash Digital Signature of the current BIOS image 220. In another embodiment, the total size of the Area Table 502 is verified against the sum of each size of the Flash Area Records 510(0) to 510(n−1) stored in Area Table 502.

In another embodiment, an access check is performed to verify that the data structure has a virtual address layout that is compatible with the physical address layout of the primary portion 204 and secondary portion 206. In one embodiment, the address range of each Flash Range Record 512 is verified against the segment layout of the primary portion 204 and the secondary portion 206. In one embodiment, a BIOS Segment Table is created that maps the physical segment layouts of the primary portion 204 and secondary portion 206. The BIOS Segment Table shows the start address and limit address of each segment of Flash memory. The address range of a segment of Flash memory to be accessed in secondary portion 206 must match or contain the address range of its corresponding Flash Range Record 512 from the Area Table 502. Thus, the virtual address layouts of the Flash Range Records 512 must be compatible with the physical address layouts of the secondary portion 206.

Returning to FIG. 3, a determination is next made in a decision block 315 to whether any access checks have failed. If any part of the access checks fails, the logic proceeds to block 330, which generates an error signal and stops the update operation as before. In one embodiment, if the access check fails, an error code status is returned to indicate that the verification of the Area Table 502 has failed.

If no failures are detected in decision block 315, the administration check is performed in a block 316. The administration check verifies whether a requested write operation to the secondary portion 206 of the BIOS 202 is authorized. In one embodiment, a BIOS update utility verifies that the user requesting the update of BIOS 202 has proper authority. In another embodiment, computer system 200 verifies the access level of the user requesting a BIOS update. Typically, the user must have the access level of a system administrator to perform a BIOS update. If the administration check fails, as determined in a decision block 317, an error signal is generated and the BIOS update process in block 330.

If it is determined that the administration check is successful in decision block 317, the new BIOS image 402 is written to the secondary portion 206 in a block 318. The new BIOS image 402 is written according to the data structure built in block 312, such as Area Table 502. In one embodiment, each time a segment of Flash memory is written to, the address range of the Flash Area Record 510 is verified against the address range of the segment in the secondary portion 206 to ensure the write will not exceed a segment of Flash memory. In another embodiment, for every write operation of a Flash Area Record 510, a read echo is performed to ensure the write to secondary portion 206 was performed without error.

In addition, while the new BIOS image 402 is written to the secondary portion 206, a checksum is performed on the new BIOS image 402, as depicted in block 318. In one embodiment, for every write operation into each Flash segment of the secondary portion 206, a written checksum value is maintained that computes the sum of every byte written to the secondary portion. The written checksum value is stored in a secure checksum location in the secondary portion 206. In another embodiment, the written checksum value is maintained by the computer system 200 in a temporary storage, such as a cache, and the like. Also, an Area Table checksum value is generated by computing the sum of each byte in the Area Table 502 corresponding to the new BIOS image 402. If the written checksum value matches the Area Table checksum value, as shown in a decision block 321, then the checksum passes. In response to a passing checksum, the notification bit 216 is set, as shown in a block 322. If the values do not match, then the checksum fails. In this case, the logic proceeds to block 330 to generate an appropriate error signal and stop the BIOS update process.

In another embodiment, the checksum is computed as follows. The Area Table checksum value is added to the written checksum value. If the sum of these two values is 0, then the checksum passes, as shown in block 321. The notification bit 216 is set, as shown in block 322. If the sum of these two values is not 0, then the checksum fails, as shown in block 321. In this case, an error signal is generated and the BIOS update process is stopped, as per block 330.

After successful boot from the new BIOS image 402, the labeling of the primary portion 204 and the secondary portion 206 is swapped in BIOS 202. In one embodiment, hardware of computer system 200 is responsible for toggling the upper address bit to switch the primary portion 204 and the secondary portion 206. The location of the upper address bit is dependent on the size of the BIOS 202. Thus, any subsequent updates of the BIOS 202 will be written to the secondary portion 206, while the primary portion 204 is treated as read-only.

Figure 6:
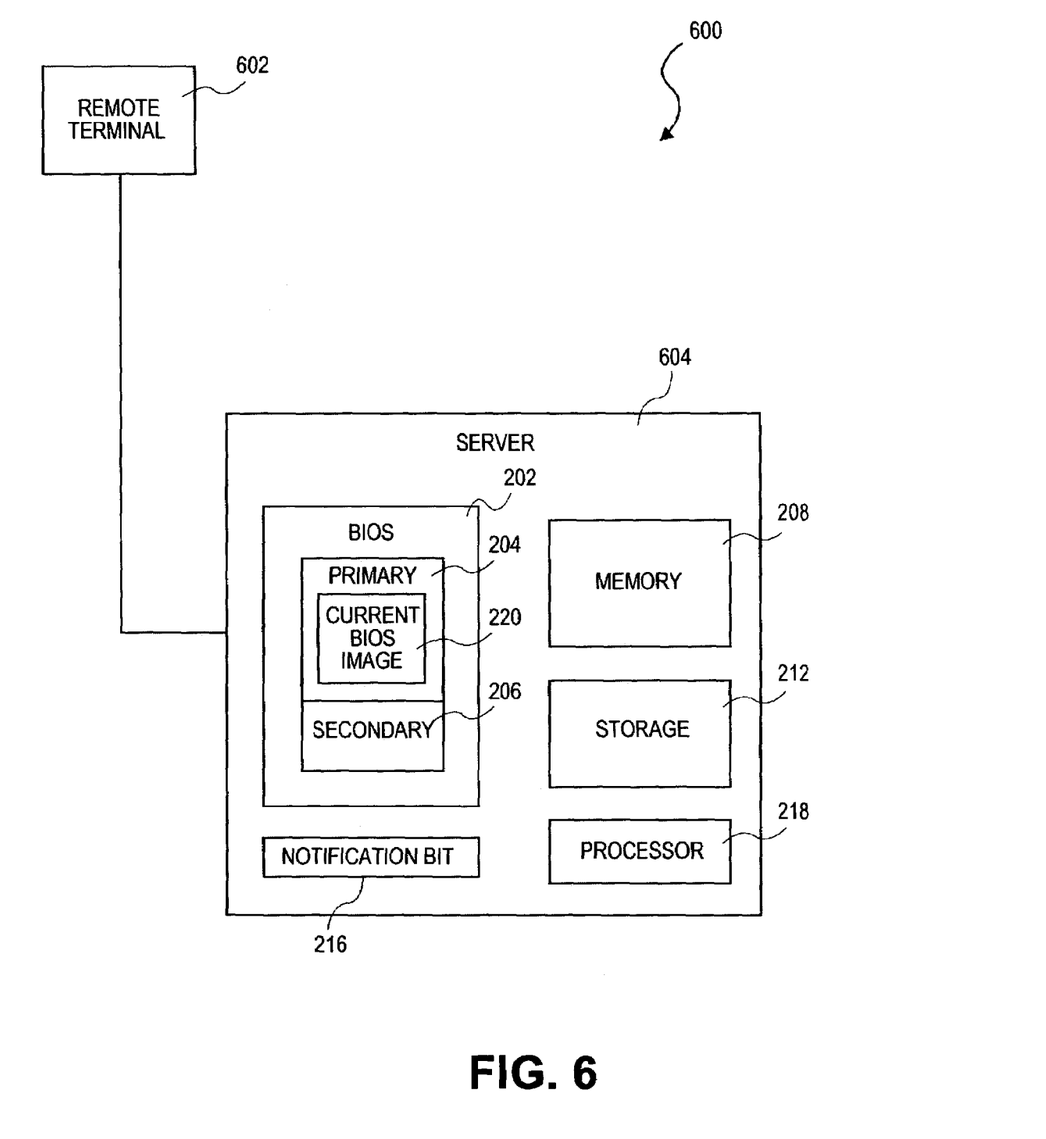
FIG. 6 is a schematic diagram of a system in which an embodiment of the invention may be implemented.

FIG. 6, shown generally at 600, is one embodiment of the present invention. In one embodiment, a remote terminal 602 is coupled to a server 604. The server 604 includes a BIOS 202, a buffer 208, a storage 212, a processor 218, and a notification bit 216, all interconnected via a bus (not shown). The BIOS 202 includes a primary portion 204, which has stored a current BIOS image 220, and a secondary portion 206. The remote terminal 602, as well as the server 604, may be implemented by a computer system as described in conjunction with FIG. 7. Remote terminal 602 is coupled to server 604 by a local area network (LAN), a wide area network (WAN), the Internet, a hard wire connection, or the like.

In one embodiment, a user updates the BIOS of server 604 via the remote terminal 602. Using the remote terminal 602, the user logs-on to the server 604 and gains access to the server 604. The user operates the remote terminal 602 to send and to store a new BIOS capsule 404 on storage 212 of server 604. In one embodiment, the new BIOS capsule 404 is sent from remote terminal 404 to server 604. In this embodiment, the new BIOS capsule 404 can be loaded from a CD-ROM, a floppy disc, or a hard drive on the remote terminal 602. In another embodiment, the new BIOS capsule 404 is downloaded from the Internet to the remote terminal 602 and then sent from the remote terminal 602 to server 604. In another embodiment, the new BIOS capsule 404 is downloaded from a network (such as the Internet) directly to server 604 by a request from the user at remote terminal 602. In another embodiment, the new BIOS capsule 404 is loaded into storage 212 at server 604 via a CD-ROM, or the like, and the BIOS update process is activated by a user at the remote terminal 602.

The BIOS 202 of server 604 is updated via the method described above in conjunction with FIGS. 2-5. In one embodiment, the BIOS update utility to perform the BIOS update is stored on remote terminal 602. In another embodiment, the BIOS update utility is stored on server 604. Also, in an embodiment of the present invention, the error signal of block 330 can be used to generate an error message for the user on remote terminal 602 and/or server 604.

Figure 7:
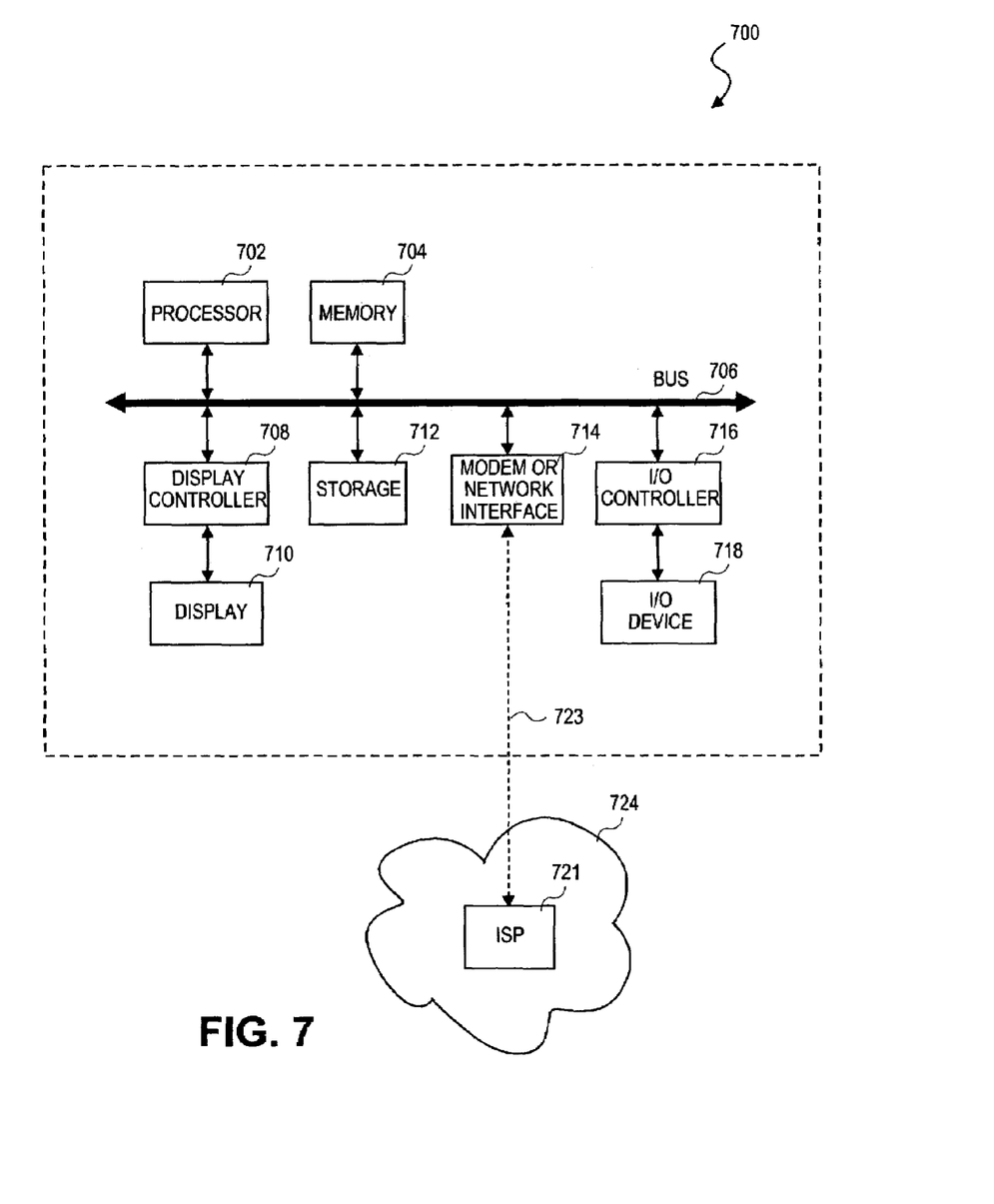
FIG. 7 is a schematic diagram of a computer system suitable for implementing an embodiment of the invention.

FIG. 7 is an illustration of one embodiment of an example computer system 700 that can be used for the computer systems included in FIGS. 2-6. Computer system 700 includes a processor 702 coupled to bus 706. Memory 704, storage 712, display controller 708, input/output controller 716 and modem or network interface 714 are also coupled to bus 706. The computer system 700 interfaces to external systems through the modem or network interface 714. This interface 714 may be an analog modem, Integrated Services Digital Network (ISDN) modem, cable modem, Digital Subscriber Line (DSL) modem, a T-1 line interface, a T-3 line interface, token ring interface, satellite transmission interface, or other interfaces for coupling a computer system to other computer systems. A carrier wave signal 723 is received/transmitted by modem or network interface 714 to communicate with computer system 700. In the embodiment illustrated in FIG. 7, carrier waive signal 723 is used to interface computer system 700 with an Internet Service Provider (ISP) 721 to communicate with computer network 724. In one embodiment, the new BIOS capsule 404 is downloaded via the modem or network interface 714 from another computer system (not shown) coupled to the computer network 724.

Processor 702 many be a conventional microprocessor including, but not limited to, an Intel Corporation x86, Pentium family microprocessor, or Itanium family processor, a Motorola family microprocessor, or the like. Memory 704 may be dynamic random access memory (DRAM) and may include static random access memory (SRAM). Display controller 708 controls in a conventional manner a display 710, which in one embodiment may be a cathode ray tube (CRT), a liquid crystal display (LCD), and active matrix display or the like. An input/output device 718 coupled to input/output controller 716 may be a keyboard, disk drive, printer, scanner and other input and output devices, including a mouse, trackball, trackpad, joystick, or other pointing device.

Storage 712 in one embodiment may be a magnetic hard disk, an optical disk, or another form of storage for large amounts of data. Some the data may be written by a direct memory access process into memory 704 during execution of software in computer system 700. It is appreciated that software may reside in storage 712, memory 704 or may be transmitted or received via modem or network interface 714. For the purposes of the specification, the terms "machine readable media" shall be taken to include any medium that is capable of storing or encoding a sequence of instructions for execution by processor 702 to cause processor 702 to perform the methodologies of the present invention. The term "machine-readable media" shall be taken to include, but is not limited to, solid-state memories, optical and magnetic disks, carrier wave signals, or the like.

It will be appreciated that computer system 700 is one example of many possible computer systems that have different architectures. For example, computer systems that utilize Microsoft Windows operating system in combination with Intel microprocessors often have multiple buses, one of which may be considered a peripheral bus. Network computers may also be considered as computer systems that may be used with the present invention. Network computers may not include a hard disk or other mass storage, and the executable programs are loaded from a corded or wireless network connection into memory 704 for execution by processor 702. In addition, handheld or palmtop computers, which are sometimes referred to as personal digital assistants (PDAs), may also be considered as computer systems that may be used with the present invention. As with network computers, handheld computers may not include a hard disk or other mass storage, and the executable programs are loaded from a corded or wireless network connection into memory 704 for execution by processor 702. A typical computer system will usually include at least a processor 702, memory 704, and a bus 706 coupling memory 704 to processor 702.

It will also be appreciated that in one embodiment, computer system 700 is controlled by operating system software that includes a file management system, such as a disk operating system, which is part of the operating system software. For example, one embodiment of the present invention utilizes Microsoft Windows as the operating system for computer system 700. In another embodiment, other operating systems such as for example but not limited to the Apple Macintosh operating system, the Microsoft Windows CE operating system, the Linux operating system, the Unix operating system, the 3Com Palm operating system, or the like may also be use in accordance with the teachings of the present invention.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method, comprising:
    loading a current BIOS image from a first portion of a BIOS storage device of a computer system during a boot of the computer system;
    receiving a new BIOS image at the computer system;
    storing the new BIOS image into a computer system buffer;
    writing the new BIOS image into a second portion of the BIOS storage device if at least two validation checks of a multi-layer BIOS update check are successfully completed; and
    providing indicia to the computer system to identify which of the current and new BIOS images stored in the BIOS storage device are to be loaded during a subsequent boot of the computer system according to at least one additional validation check that is different from the at least two validation checks of the multi-layer BIOS update check wherein performing the at least one additional validation check includes performing an access check to verify an address layout to write the new BIOS image is compatible with the address layout of the BIOS storage device.

2. The method of claim 1, providing indicia further comprising:
    performing the at least one additional validation check for the new BIOS image; and
    providing indicia to instruct the computer system to load the new BIOS image during a subsequent boot if said at least one additional validation check passes, otherwise providing indicia to instruct the computer system to load the current BIOS image during the subsequent boot.

3. The method of claim 2, further comprising generating an error signal if the at least one additional validation check fails.

4. The method of claim 2, wherein performing the at least one additional validation check includes verifying the new BIOS image is appropriate for the computer system.

5. The method of claim 2, wherein performing the at least one additional validation check includes performing an administration check to verify a BIOS update for the computer system is implemented by someone with proper authorization.

6. The method of claim 2, wherein performing the at least one additional validation check includes performing a checksum of the new BIOS image.

7. The method of claim 1, wherein writing the new BIOS image includes writing portions of the new BIOS image to correspond with an address layout that is compatible with the current BIOS image.

8. The method of claim 2, wherein performing the at least one additional validation check includes:
    extracting data from the current BIOS image containing information describing attributes of the current BIOS image to a data structure; and
    comparing data in the data structure with information in the current BIOS image.

9. The method of claim 8, wherein comparing the data includes verifying a Globally Unique Identifier (GUID) in the data structure against corresponding information in the current BIOS image.

10. The method of claim 8, wherein comparing the data includes verifying a digital signature in the data structure against corresponding information in the current BIOS image.

11. The method of claim 8, wherein comparing the data includes verifying an address range in the data structure to a total of address ranges of a plurality of portions of the address range.

12. A machine readable media on which a plurality of instructions are stored, which when executed perform operations comprising:
    extracting a new BIOS image from a new BIOS capsule stored on a computer system, the computer system including a BIOS storage device having first and second portions, said first portion having a current BIOS image stored therein;
    performing at least two validation checks of a multi-layer BIOS update check to validate that BIOS instructions for the computer system should be updated from the current BIOS image to the new BIOS image;
    selectively writing the new BIOS image into the second portion of the BIOS storage device if the at least two validation checks of the multi-layer BIOS update check are successfully completed; and
    providing indicia to the computer system identifying which of the current and new BIOS images stored in the BIOS storage device are to be loaded during a subsequent boot of the computer system according to at least one additional validation check that is different from the at least two validation checks of the multi-layer BIOS update check wherein performing the at least one additional validation check includes performing an access check to verify an address layout to write the new BIOS image is compatible with the address layout of the BIOS storage device.

13. The machine readable media of claim 12, wherein the indicia comprises a notification bit stored in a predetermined location.

14. The machine readable media of claim 12, wherein execution of the instructions further performs the operation of generating an error signal if any of the layers in the multi-layer BIOS update check fails.

15. The machine readable media of claim 12, wherein performing the multi-layer BIOS update check includes performing a check to verify the new BIOS image is suitable for the computer system.

16. The machine readable media of claim 12, wherein performing the multi-layer BIOS update check includes performing an access check to verify the integrity of a data structure containing information from the current BIOS image against the current BIOS image, the data structure to be used to write the new BIOS image to the second portion of the BIOS storage device.

17. The machine readable media of claim 12, wherein performing the multi-layer BIOS update check includes performing an administration check to verify writing the new BIOS image into the second portion of the BIOS storage device is requested by a proper authority.

18. The machine readable media of claim 12, wherein performing the multi-layer BIOS update check includes performing a checksum of the new BIOS image written into the second portion of the BIOS storage device.

19. The machine readable media of claim 12, wherein a portion of the plurality of instructions comprise a BIOS update utility to manage updating the BIOS of the computer system.

20. A computer system, comprising:
a memory;
a BIOS storage device partitioned into first and second portions, said first portion containing a current BIOS image;
a network interface; and
a processor, coupled to the memory, the BIOS storage device and the network interface, to execute instructions contained in at least one of the memory and the BIOS storage device, execution of the instructions performing operations comprising:
selectively writing BIOS instructions from a new BIOS image received at the computer system via the network interface to the second portion of the memory space for the BIOS storage device if at least two validation checks of a multi-layer BIOS update check are successfully completed;
performing at least one additional validation check that is different from the at least two validation checks of the multi-layer validation check for the new BIOS image; and
providing indicia to instruct the computer system to load BIOS instructions from the new BIOS image during a subsequent boot if the at least one additional validation check passes, otherwise providing indicia to instruct the computer system to load BIOS instructions from the current BIOS image during the subsequent boot, wherein the new BIOS image and the current BIOS image are stored in the BIOS storage device wherein performing the at least one additional validation check includes performing an access check to verify an address layout to write the new BIOS image is compatible with the address layout of the BIOS storage device.

21. The computer system of claim 20, wherein performing the at least one additional validation check includes performing an access check to verify the integrity of a data structure to be used to write BIOS instructions from the new BIOS image to the second portion of the BIOS storage device.

22. The computer system of claim 20, wherein performing the at least one additional validation check includes performing an administration check to verify a BIOS update for the computer system is implemented by someone with proper authorization.

23. The computer system of claim 20, wherein performing the at least one additional validation check includes performing a checksum of the new BIOS image.

24. A method comprising:
sending data containing a new BIOS image from a first computer to a second computer, said second computer including a BIOS storage device containing a partitioned memory space including first and second portions, the first portion storing a current BIOS image containing BIOS instructions for performing BIOS operations for the second computer;
selectively writing BIOS instructions from the new BIOS image to the second portion of the memory space for the BIOS storage device if at least two validation checks of a multi-layer BIOS update check are successfully completed;
performing at least one additional validation check that is different from the at least two validation checks of the multi-layer validation check for the new BIOS image; and
providing indicia to instruct the second computer to load BIOS instructions from the new BIOS image during a subsequent boot if the at least one additional validation check passes, otherwise providing indicia to instruct the second computer to load BIOS instructions from the current BIOS image during the subsequent boot, wherein the new BIOS image and the current BIOS image are stored in the BIOS storage device wherein performing the at least one additional validation check includes performing an access check to verify an address layout to write the new BIOS image is compatible with the address layout of the BIOS storage device.

25. The method of claim 24, wherein the new BIOS image is sent as a BIOS update capsule that further includes a BIOS update utility to manage updating the BIOS on the second computer, the method further comprising:
extracting the BIOS update utility from the BIOS update capsule; and
executing the BIOS update utility to perform the at least one additional validation check and provide the indicia that identifies from which of the current and new BIOS images the BIOS instructions are to be loaded during the subsequent boot of the second computer.

26. The method of claim 25, wherein the at least one additional validation check includes performing an administration check to verify the BIOS capsule was sent by an operator of the first computer who has authorization to update the BIOS for the second computer.

* * * * *

UNITED STATES PATENT AND TRADEMARK OFFICE
CERTIFICATE OF CORRECTION

| | | |
|---|---|---|
| PATENT NO. | : 7,337,309 B2 | Page 1 of 1 |
| APPLICATION NO. | : 10/396634 | |
| DATED | : February 26, 2008 | |
| INVENTOR(S) | : Nguyen et al. | |

It is certified that error appears in the above-identified patent and that said Letters Patent is hereby corrected as shown below:

In column 4, at line 1, delete "bullding" and insert --building--.

In column 4, at line 3, delete "utlllty" and insert --utility--.

In column 4, at line 5, delete "Generelly" and insert --Generally--.

In column 4, at line 6, delete "downloadlng" and insert --downloading--.

In column 4, at line 8, delete "resadble" and insert --readable--.

In column 4, at line 15, delete "Eo" and insert --to--.

In column 4, at line 17, delete "computhr" and insert --computer--.

In column 4, at line 16, delete "nut" and insert --not--.

In column 5, at line 8, delete "totel" and insert --total--.

Signed and Sealed this

Second Day of September, 2008

JON W. DUDAS
*Director of the United States Patent and Trademark Office*